(12) United States Patent
Cho et al.

(10) Patent No.: US 10,394,836 B2
(45) Date of Patent: Aug. 27, 2019

(54) OPERATOR TAG SEARCH SYSTEM

(71) Applicant: Uber Technologies, Inc., San Francisco, CA (US)

(72) Inventors: Frank Seo Cho, San Francisco, CA (US); John Conway Badalamenti, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 962 days.

(21) Appl. No.: 14/856,078

(22) Filed: Sep. 16, 2015

(65) Prior Publication Data
US 2017/0075536 A1    Mar. 16, 2017

(51) Int. Cl.
| | |
|---|---|
| *G06F 3/0482* | (2013.01) |
| *G06F 16/248* | (2019.01) |
| *G06F 16/9535* | (2019.01) |
| *G06F 3/0484* | (2013.01) |
| *G06F 3/0486* | (2013.01) |

(52) U.S. Cl.
CPC .......... *G06F 16/248* (2019.01); *G06F 3/0482* (2013.01); *G06F 3/0486* (2013.01); *G06F 3/04842* (2013.01); *G06F 16/9535* (2019.01)

(58) Field of Classification Search
CPC .. G06F 3/0486; G06F 3/0482; G06F 3/04842; G06F 17/30867; G06F 17/30554; G06F 16/248; G06F 16/9535
See application file for complete search history.

(56) References Cited

U.S. PATENT DOCUMENTS

| | | | | |
|---|---|---|---|---|
| 5,734,884 A | * | 3/1998 | Eberhard | G06F 11/34 |
| 7,720,833 B1 | * | 5/2010 | Wen | G06F 17/30867 707/706 |
| 9,286,410 B2 | * | 3/2016 | Hong | G06F 17/2247 |
| 9,582,253 B2 | * | 2/2017 | Aman | G06F 16/24 |
| 2009/0063299 A1 | * | 3/2009 | Amacker | G06Q 30/0603 705/26.64 |
| 2009/0150351 A1 | * | 6/2009 | Buck | G06F 17/30398 |
| 2011/0099040 A1 | * | 4/2011 | Felt | G06F 17/3087 705/7.12 |
| 2013/0238545 A1 | * | 9/2013 | Fuchs | G06Q 10/00 706/47 |
| 2016/0042303 A1 | * | 2/2016 | Medina | G06Q 10/02 705/5 |
| 2016/0334950 A1 | * | 11/2016 | Nelson | G06Q 30/00 |

* cited by examiner

*Primary Examiner* — William L Bashore
*Assistant Examiner* — Gregory A Distefano
(74) *Attorney, Agent, or Firm* — Mahamedi IP Law LLP

(57) ABSTRACT

An operator tag search system can generate a search page including a search box and identify an initial set of user inputs in the search box. The search system can generate operator tags in the search box, where each operator tag includes a selected search property, an operator, and an inputted value. The search system can perform a dynamic search in one or more databases to satisfy each of the operator tags. Based on the dynamic search, the search system can generate a results feature for display on the search page.

19 Claims, 9 Drawing Sheets

OPERATOR TAG SEARCH SYSTEM

BACKGROUND

Internet search tools have enabled information access to become more and more targeted. Filtered searching allows a search engine to analyze a given set of content to exclude items that don't meet certain criteria. Faceted searching extends the idea of filters into a complex structure that enables a search to describe the different aspects of a particular targeted item.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
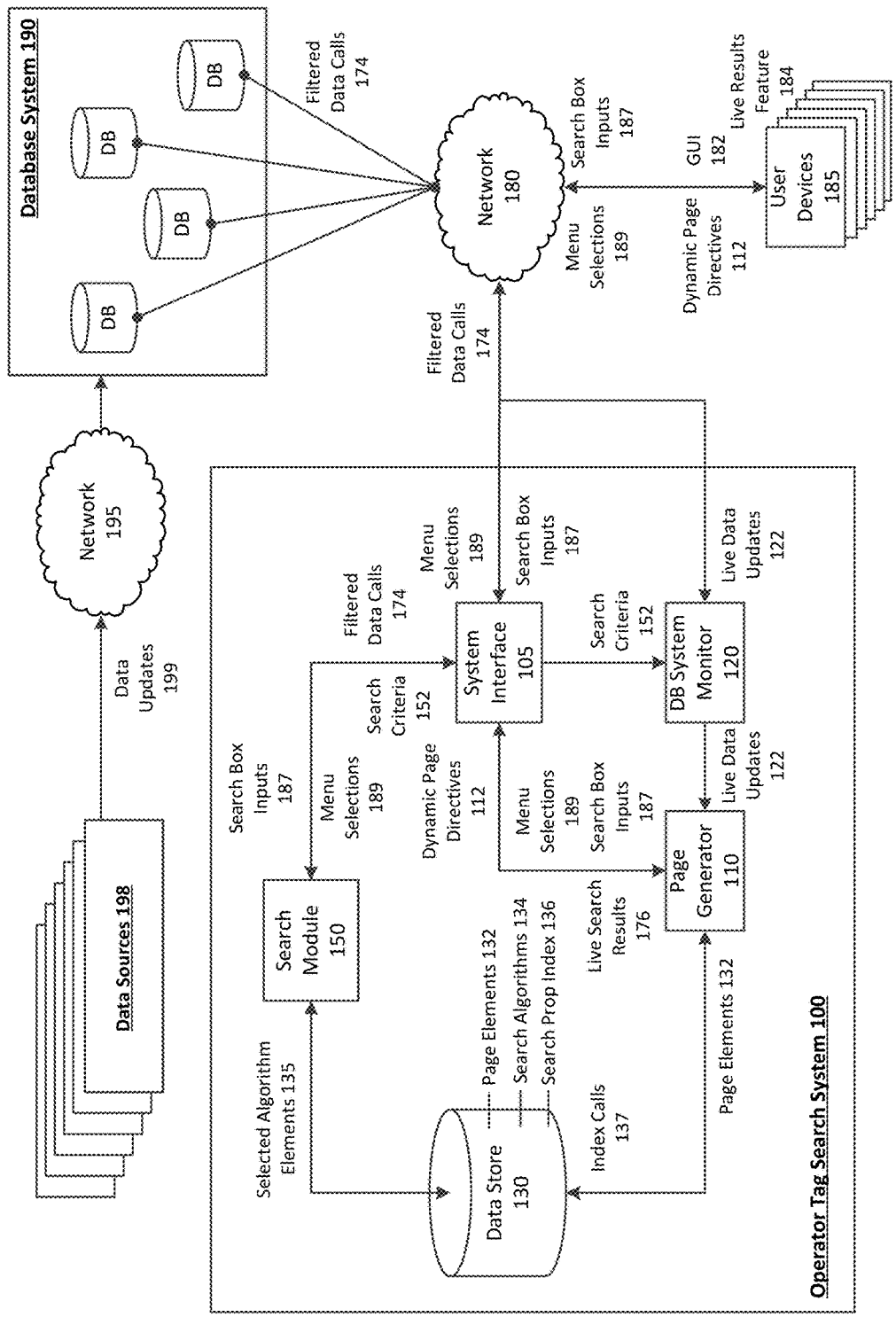
FIG. 1 is a block diagram illustrating an example operator tag system as described herein.

According to examples described herein, an operator tag search system is provided that includes search tool features to enable users to more accurately target a search utilizing operator tags. As referred to herein, an operator tag can correspond to a user interface feature or graphic that a user can interact with, via user input, in order to facilitate or request a search. For example, such an operator tag can include a property, an operator, a value, and/or a modifier. Still further, in some examples, a user can interact with the features of an operator tag(s) in order to combine and join operator tags to further provide a more accurately targeted search. As compared to conventional search tools that are cumbersome to use by a user, the operator tag search system can dynamically search any number of live databases based on operator tags inputted by a user to refine search results and provide a dynamic results page.

In some examples, the operator tag search system can generate a search page (e.g., a search page user interface) including a search box for display on a user device. The search system can interface with user devices and databases, and/or can be implemented, at least in part, using processing resources of the user device, for example, via a search application or browser plug-in. The search system can identify respective sets of initial user inputs in the search box and respond to each input dynamically based on a context of the input. For example, an initial click input or an input of an alphanumeric character can trigger the search system to generate a search property menu (e.g., a drop-down menu) comprising any number of search properties and/or parameters. The user may continue inputting in the search box or select a particular search property in the menu. For each inputted character in the search box, the search system can update the search property menu to include only those search properties that satisfy the inputs.

In various examples, the search system can initiate a dynamic search in a number of databases that satisfies the selected search property and generate a results feature on the search page showing a listing of the dynamic search results. In some examples, the results feature can be a "live" results feature on the search page. As used herein, a "live" results feature can be automatically updated based on real-time changes logged or updated in a number of databases providing the results. In conjunction, the search system can generate an "operator tag" for the selected search property to enable the user to set one or more constraints for the selected search property. The operator tag can "nest" the selected search property and include an operator menu comprising a plurality of operators (e.g., a less than operator, greater than or equal to operator, a does not equal operator, etc.), and a value region to enable the user to input a value that fuses the operator tag for the dynamic search.

At any given time, the search system can dynamically monitor the search box to modify the dynamic search, and monitor the one or more databases for updates to data that satisfy the dynamic search. In many examples, the search system can update the dynamic search and the live results feature on the search page based on any number of triggers. Such triggers can include an update to data in the monitored database(s), a new search property being selected in the search box, a new operator tag being generated in the search box to narrow the dynamic search, an current operator tag in the search box being deleted, an operator tag in the search box being modified in any way, a "qualifier element" being selected and configured by the user in the search box, a qualifier element being joined to an operator tag in the search box to further constrain the operator tag, and the like.

Any number of operator tags may be generated in the search box for a particular dynamic search. Each generated operator tag can include a user-selected search property, which can be utilized by the search system to broadly target the dynamic search. Furthermore, each search property can be bound by an operator and an inputted value, which act to fuse the operator tag. The search system can interpret each operator tag as a single search filter for the dynamic search. For example, gaps between each operator tag may be interpreted as BOOLEAN "AND" operators, whereas each operator tag itself may set boundaries to the nested search property—for example, via a selected operator within the operator tag and an inputted value upon which the operator may bind the nested search property. Thus, multiple operator tags may be configured and manipulated by a user within the search box, causing the search system to dynamically modify search parameters in executing a corresponding dynamic search in the database(s). For each dynamic modification, as well as for each database update that satisfies the dynamic search, the search system can update the live results feature displayed on the search page.

In various implementations, the initial search property menu (generated in response to an input in the search box) can further include a number of "qualifier elements" that may be standalone within the search box, or joined to a particular operator tag. As used herein, a standalone qualifier element may be referred to as simply a "qualifier element" that sets one or more thresholds to the entire dynamic search (e.g., all of the operator tags in the search box). In contrast, a joined qualifier element, joined to a particular operator tag, may be referred to herein as a "tag modifier" that sets one or more thresholds for the particular operator tag, thereby creating a "qualified operator tag." Whether standalone or joined, the qualifier element or tag modifier can enable a user to set a particular range, such as a date range, a time range, a location radius, etc., for the dynamic search. When standalone, the qualifier element can cause the search system to place range limits on the dynamic search as a whole based on the threshold(s) provided or inputted in the standalone qualifier element. When joined to a particular operator tag (e.g., via a select-and-drag input), the tag modifier can cause the search system to only place range limits on the qualified operator tag upon which the tag modifier is joined.

In certain implementations, the operator tag search system can be utilized in connection with a transportation facilitation system, such as the transportation facilitation platform managed by UBER TECHNOLOGIES, INC. In such implementations, live databases can store driver and rider data and may be updated in real time (or close to real time). For example, driver data can include a driver profile, a current driver rating, a current availability, reputation data, a trip count, user reviews, a vehicle model and year, vehicle characteristics, vehicle service data, service type, a current region of operation, a sign-up service area, an address, destination-specific ratings, trip profiles, and the like. Rider data can include, for example, a rider profile, rider reviews and ratings, rider preferences (e.g., specified by the rider or identified by the transportation facilitation system), a rider area or region, address (e.g., home and/or work), trip profiles, and the like. Such driver and rider data may be updated in real time by the transportation facilitation system. Furthermore, the driver and/or rider data can comprise search properties for input into the search box on the search page generated in connection with the operator tag search system. Thus, the operator tag search system can monitor the database(s) associated with the transportation facilitation system to update a dynamic search and live results page based on data updates that satisfy a current dynamic search.

Among other benefits, the examples described herein achieve a technical effect of facilitating more accurately targeted searches and providing dynamic search results. Conventional searching techniques involve faceted search, which enable users to apply a sequenced series of filters, from broadest to narrowest, based on a term hierarchy. However, such faceted searching typically involves a set of filters as constraints for a remnant search upon which all such filters are applied. Search techniques described herein utilize a dynamic framework based on individual inputs, constructed operator tags, qualifier elements that may be standalone or joined to operator tags, and/or a monitoring system that can update a live results feature based on updated data. Furthermore, while constraints may be placed on certain facets in current search techniques, these techniques still utilize a broadest-to-narrowest approach that requires a correct chosen path through a fractal implemented data search—where one wrong path in the fractal search chain can result in imprecise search results. Techniques described herein provide a freeform search interface for users to freely configure, manipulate, and set thresholds to the whole of a dynamic search, and/or any step in a dynamic search chain.

As used herein, a "search property" is a user-selected or defined search term that enables the operator tag search system to set a search parameter for a dynamic search. Search parameters for a particular search property may yield a list of results. For example, a search property may define any term in any hierarchy of a search. A search property may be more specific (e.g., "restaurants within five miles of current location having a rating greater than 4.5 within the last 2 months" or last name of a rider or driver), or more broad (e.g., "currently available drivers in San Francisco" or drivers that signed up for the transportation facilitation platform before a certain date). Since such search terms warrant a list of qualifying items that satisfy the criteria, the operator tag search system can automatically generate an operator tag for the search property within the search box. Furthermore, a search property may be standalone or joinable to operator tags in the search box if it is a term that does not warrant constraints (e.g., a particular place or a single adjective). For example, the term "Montreal Canada" does not warrant constraints because there is only one Montreal Canada.

An "operator" operates on the search property to define one or more constraints for a search based on the search property, whereas an "inputted value" can define one or more boundaries for the search property. For example, the user can input or select "San Francisco" as a search property which can remain standalone in the search box (and constrain an entire dynamic search to San Francisco). The user may then input "housing prices," which can trigger an operator tag to be generated. The user can the select the "less than or equal to" operator and input a value of say, $850,000 for that operator tag. The dynamic search can yield results from a number of sources (namely those listing or valuing properties in San Francisco) that satisfy these search constraints.

As used herein, an "operator tag" is a programmatically generated singular item comprising at least a search property, an operator, and an inputted value. An operator tag can be a separate user-defined filter for a search. Multiple operator tags can be combined and implemented in the search box, along with standalone search properties, to set the constraints for a particular search. Furthermore, operator tags themselves may be qualified by "tag modifiers" or "qualifier elements" which can further constrain the whole search or just an individual operator tag if joined to an operator tag. As described above, a standalone qualifier element may be referred to as simply a "qualifier element" that sets one or more thresholds to the entire dynamic search (e.g., all of the operator tags in the search box). In contrast, a joined qualifier element, joined to a particular operator tag may be a "tag modifier" that sets one or more thresholds for the particular operator tag, thereby creating a "qualified operator tag."

As used herein, a "dynamic search" can comprise a database monitoring system and a search box monitor to dynamically modify search parameters base on changes to either (e.g., user alterations to operator tags in the search box, or data updates in the database(s)). The results of a dynamic search can also be generated in real time for display on the user device. Thus, any modification in the search box or data update in the database(s) can trigger both an update to the dynamic search and the live results feature generated on the search page.

As used herein, a computing device refer to devices corresponding to desktop computers, cellular devices or smartphones, personal digital assistants (PDAs), laptop computers, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Operator Tag Search System

FIG. 1 is a block diagram illustrating an example operator tag system as described herein. The operator tag search system 100 can be in communication with a number of user devices 185 over a network 180, or may operate to utilize the processing resources of the user devices 185 themselves (e.g., such as part of a browser plug-in or downloaded application on a user device 185). The operator tag search system 100 can further access a database system 190, which may be central to a particular service (e.g., a valuation service, a sales service, an asset sharing service, etc.), or may be ubiquitous (e.g., the Internet). As such, the database system 190 can be connected to a number of data sources 198 that can provide data updates 199 or new data content for storage in the database system 190 via one or more networks 195 (or the network 180). Such data updates 199 may be live updates to data logs that indicate a current status of a particular user or asset (e.g., an update to the current rating of a restaurant, a price change on a house, etc.).

In many examples, the operator tag search system 100 can include a page generator 110 and a data store 130 that can include a variety of stored page elements 132. While the example of FIG. 1 illustrates the data store 130 as being local to the operator tag search system 100, in other examples, the data store 130 can be part of the database system 190 or another database system that is accessible by the operator tag search system 100. The page generator 110 can detect a request (e.g., a browser request) for a search GUI 182, and in response, can generate the search GUI 182 for display on the user device 185. The search GUI 182 can include a search box for the user to enter search box inputs 187 to define a search. Such search box inputs 187 can include a touch-input or click-input in the search box, and/or individual type inputs that are provided by a user using one or more input mechanisms of the user device 185 (e.g., a mouse, a touch-sensitive display, a keyboard, etc.).

According to examples, the operator tag search system 100 can include a system interface 105 which can monitor the search box (and/or other portions of the GUI 182) for individual search box inputs 187 and provide each individual input to the page generator 110. The page generator 110 can interpret each individual input as a trigger to generate a particular page element 132 for display on the user device 185. For example, an initial touch or click input in the search box can trigger the page generator 110 to generate a search property selection menu that can include any number of search properties and qualifier elements. The page generator 110 can transmit a dynamic page directive 112 to the user device 185 to cause the search property selection menu to be displayed on the search page GUI 182 (e.g., a drop-down menu from the search box).

Additionally or alternatively, after the initial input, the user can provide any number of additional search box inputs 187 (e.g., type inputs), which can trigger the page generator 110 to transmit additional dynamic page directives 112 in response to each individual input 187. Each transmitted page directive 112 can satisfy criteria of the aggregate of the search box inputs 187. Accordingly, each respective additional search box input 187 can result in a dynamic page directive 112 that filters through the previous search property results (corresponding to the previous search box input 187) to return a new set of search property results that satisfies all of the search box inputs 187.

Each new set of search property results (or a selected portion thereof) can be displayed dynamically in the search property selection menu on the search page GUI 182. If a returned set of search properties is rather lengthy (e.g., the number of search properties is greater than a threshold number), the page generator 110 can automatically apply a hierarchy to the returned set based on one or more factors. For example, the page generator 110 can transmit a page directive 112 to the user device 185 to display a select portion of the returned search property results based on a selection popularity hierarchy—in which the top results are search properties most applied by the user device 185, a set of user devices 185, or the aggregation of all user devices 185 utilizing the operator tag search system 100. It is to be emphasized that such dynamic page directives 112 may be generated by the page generator 110 and transmitted in real-time, as the user types in the search box, for each respective search box input 187 to update the search property menu on the search page GUI 182.

At any given time, the user can make a menu selection 189 of a particular search property from the search property menu, which can trigger the page generator 110 and/or a search module 150 of the operator tag search system 100 to perform a number of actions. In some example systems, the menu selection 189 of the search property in the search box can trigger the search module 150 to initiate a dynamic search based on the selected search property. The search module 150 can generate a filtered data call 174 for transmission to a database system 190 (e.g., a local service entity's database system, a partnered database system, an activity log system, the Internet, etc.). The filtered data call 174 can include a number of search parameters to local data content that satisfies the menu selection 189 of the search property. Consequently, the database system 190 can return live search results 176 to the operator tag search system 100 based on the filtered data call 174. The live search results 176 can be analyzed by the page generator 110, which, in turn, can generate dynamic page directives 112 to update the search page GUI 182 to include a live results feature 184 showing the results of the dynamic search.

In conjunction with triggering the search module 150 to construct the filtered data call 174, the menu selection 189 of a search property can also trigger the page generator 110 to generate an operator tag for the selected search property for display in the search box. The operator tag may be a single constructed element that can enable search constraints on the selected search property. The operator tag can include the search property, an operator menu, and a value region. The user can interact with the operator tag to provide an input to specify an operator from the operator menu and an input to specify a value in the value region—which can trigger the search module 150 to update the dynamic search by filtering the data call 174 to the database system 190.

Example operators for the operator tag can include a less than operator, a less than or equal to operator, a greater than operator, a greater than or equal to operator, an equal to operator, and a does not equals operator. The inputted value in the value region may be any value, for example, such as a numerical value, e.g., between an intuitive range considering the search property, or a character text string. For example, if the search property comprises a "current rating" for a movie, hotel, restaurant, housing complex, retail establishment, professional service entity, or a group of service professionals, the ratings range may be intuitively set between one and five stars. An inputted value over five may result in, for example, an error message, a return of zero results, or disregarding the operator tag by the search module 150.

In certain implementations, inputs in the value region of the operator tag can be monitored by the system interface 105 of the operator tag search system 100. Each individual input in the value region may be analyzed by the search module 150, which can filter the data call 174 even further based on the search property, the operator, and each respective input in the value region of the operator tag. As an example, if the search property comprises a "current rating" for service professionals in a particular field (e.g., chiropractors), and a "greater than" operator is selected, each individual input in the value region can cause the search module 150 to update the dynamic search. Along these lines, when the user inputs "4" in the value region, the search module 150 can dynamically filter the data call 174 to constrain the dynamic search to only those service professionals that have a rating higher than four stars. When the user additionally inputs "0.3" such that the inputted value comprises "4.3," the search module 150 can modify the dynamic search to filter the returned results (e.g., only chiropractors having a rating higher than 4-stars) to exclude all results for service professionals having more than 4-stars and less than 4.3-stars.

As an alternative, the search module 150 can be triggered to update the dynamic search based on the search property after an operator has been selected and the value has been fully inputted in the value region. Accordingly, in some examples, once an operator tag is generated, an operator is selected, and a value is inputted, the page generator 110 can cause a selectable search feature to be generated on a periphery of the operator tag to enable the user to trigger the search. Alternatively still, the search module 150 can await the selection of the search feature before initiating the dynamic search itself.

In various examples, once the dynamic search has be initiated and updated for the single, first operator tag in the search box, the user can provide further search box inputs 187 to further update the dynamic search. As provided herein, an additional click or touch input in the search box adjacent to, or otherwise outside of the first operator tag, can cause the page generator 110 to transmit a dynamic page directive 112 to generate another search property selection menu in the search box. The user may provide additional search box inputs 187, which can each cause the page generator 110 to update the search property menu, as discussed above. When the user selects a second search property from the additional search property menu, the page generator 110 can generate a second operator tag in the search box, enabling the user to again select an operator and input a value.

Furthermore, once the second search property is selected or specified by the user, the search module 150 can filter the data call 174 in order to update the dynamic search, which can cause the live results feature 184 on the search page GUI 182 to be updated as well. Inputs in the value region of the second operator tag can cause the search module 150 to update the filtered data call 174 for each respective input in the value region. The search module can customize updates to the filtered data call 174 and/or can pull search algorithms 134 or algorithmic elements 135 from the data store 130 to aid in the dynamic search. Thus, for each input in the value region of the second operator tag, the search module 150 can update the filtered data call 174 for transmission to the database system 190. Also, the live search results 176 based on the updates to the filtered data call 174 can be processed by the page generator 110, which can transmit additional dynamic page directives 112 to update the live results feature 184 on the search page GUI 182 in real time.

Additionally, the search property menu generated in the search box can further include standalone search properties and qualifier terms. When either a search property or a qualifier term is selected, the page generator 110 can consult a search property index 136 in the local data store 130 (e.g., make an index call 137) to identify (i) whether the selected search property or qualifier term can be operated on, or (ii)

whether the selected search property or qualifier term can further qualify a search property or operator tag in the search box. According to examples described herein, if the page generator 110 determines that the term can be operated on, the page generator 110 can automatically generate an operator tag for that term, and display the operator tag in the search box. If the page generator 110 determines that the term cannot be operated on, then the term can remain a standalone term in the search box. Additionally, if the page generator 110 determines that the term can qualify a standalone search property or an operator tag, the page generator 110 can automatically generate a qualifier element for that term, and display the qualifier element in the search box.

As discussed in detail below with respect to FIG. 2, a qualifier element in the search box can cause the search module 150 to qualify the entire dynamic search. For example, a qualifier element can specify a date range for the entire search, thus limiting the dynamic search to data content that satisfies the date range. Likewise, a standalone search property can also cause the search module 150 to qualify the entire dynamic search. For example, the standalone term "Montreal Canada" can be applied as a search term for the whole dynamic search. However, when a qualifier element is joined to an operator tag in the search box (causing the page generator 110 to generate a single qualified operator tag), the search module 150 can update the dynamic search such that the joined qualifier element only applies to that particular operator tag. For example, when a plurality of operator tags are present in the search box, a newly selected qualifier element (e.g., specifying a date range) can apply to each operator tag and/or search property in the search box. Thus, the search module 150 can narrow the dynamic search to return data content from only that specified date range. However, when the selected qualifier element is joined to a specified operator tag in the search box (e.g., a "current ratings" operator tag), the search module 150 can expand the narrowed search such that the qualifier element only applies to ratings that were contributed during the date range specified in the qualifier element. Accordingly, whenever the search module 150 updates the dynamic search the live search results 176 can cause the page generator to update the live results feature 184 on the search page GUI 182.

As described herein, any number of search properties and/or operator tags may be selected or inputted into the search box. From the search module's 150 standpoint, selection of a particular search property can initiate or update a corresponding dynamic search. Furthermore, the combined selection of an operator and inputted value for an operator tag can trigger the search module 150 to update the dynamic search. As an addition, each individual input in the value region of a particular operator tag can trigger the search module 150 to update the dynamic search. Further still, a selection of a qualifier feature can cause the search module 150 to update the dynamic search for the whole search box. And still further, a select-and-drag input to join a qualifier element to an operator tag can cause the search module 150 to update the dynamic search accordingly.

In certain implementations, the operator tag search system 100 can further include a database system monitor (DBS monitor) 120 that can monitor the database system 190 based on the filtered data call 174—which, as described above, may be dynamically updated. Within the database system's 190 framework, the DBS monitor 120 can identify update events that satisfy the current dynamic search. These live data updates 122 can be submitted to the page generator 110, which can update the live results feature 184 on the search page GUI 182 accordingly. As an illustrative example, a dynamic search based on the menu selections 189 and/or search box inputs 187 may be instigated for search criteria 152 comprising:

Example Search Box

Standalone Search Property: --available drivers--
Operator Tag 1: --current rating (search property); greater than (operator); 4.5 (value)--
Tag Modifier (OT1): --between Jul. 16, 2015 and Sep. 16, 2015--
Operator Tag 2: --location (search property); less than (operator); 3 miles (value)--

Based on the above search criteria 152, the filtered data call 174 can set search parameters for the database system 190 accordingly, and the live search results 176 can cause the page generator 110 to generate a corresponding live results feature 184 on the search page GUI 182. The filtered data call 174 can further set a three mile geo-fence surrounding the user to filter, for example, a live location log in the database system 190 that identifies the current locations of all drivers. In the search box provided, the user is searching for available drivers within three miles from a current location and having a current rating of over 4.5— where the ratings were contributed within the last two months. The dynamic search can initially yield a live results feature 184 listing, for example, three drivers that satisfy the search parameters. In certain examples, the search criteria 152 can also configure the DBS monitor 120 to monitor the database system 190 for only those live data updates 122 that satisfy the search criteria 152. In the example provided, an available driver having a current rating of 4.6-stars may transition to within three miles of the user's current location. This transition may be reflected in the available driver "crossing" the geo-fence in the live location log, which can trigger a live data update 122 for the DBS monitor 120. The live data update 122 can be submitted to the page generator 110 which can update the live results feature 184 to indicate the fourth driver that satisfies the search parameters.

As described herein, the page generator 110 can be triggered to generate a search property menu for an initial touch or click input in the search box. The page generator can further be triggered to update the search property menu for each search box input 187 typed into the search box. Menu selections 189 for search properties can trigger the page generator 110 to generate operator tags, standalone search properties, or qualifier elements. Select-and-drag inputs on the qualifier elements can trigger the page generator 110 to join or unjoin qualifier elements with operator tags. In addition, each return of live search results 176 from the database system 190 based on the dynamic search can trigger the page generator 110 to update the live results feature 184 on the search page GUI 182. Still further, live data updates 122 in the database system 190 can trigger the page generator 110 to also update the live results feature 184.

Example Search Page GUI

Figure 2:
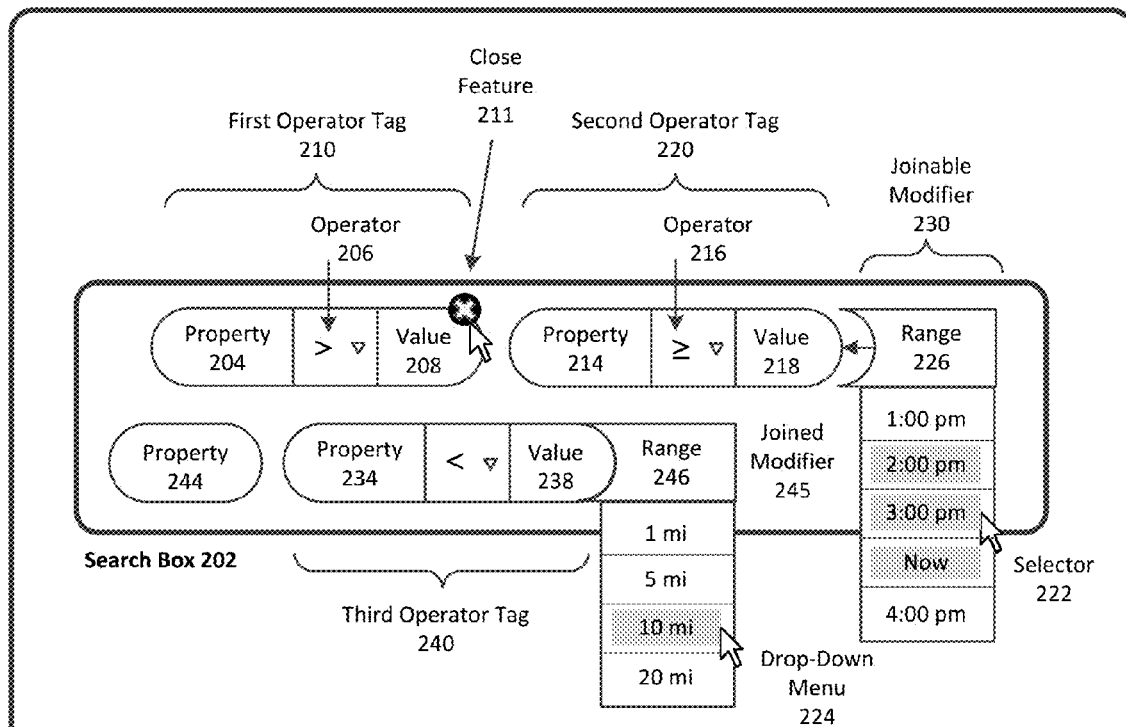
FIG. 2 depicts an example search page graphical user interface (GUI) for implementation on user devices in connection with an operator tag search system.

FIG. 2 depicts an example search page GUI for implementation on user devices in connection with an operator tag search system. In the below description of FIG. 2, reference may be made to like reference characters representing various features of FIG. 1 for illustrative purposes. Furthermore, the search page GUI 200 described in connection with FIG. 2 may be generated by an example operator tag search system 100—as illustrated in FIG. 1—and displayed on a user device 185, as further illustrated in FIG. 1. Referring to FIG. 2, the search page GUI 200 can initially include a search box 202 which can enable a user to provide any number of inputs or types of inputs. The search page GUI 200 may be displayed on a display screen of a user device, such as a personal computer (PC) or mobile computing device. In the example shown in FIG. 2, a selector 222 is shown as a traditional cursor utilized by PCs. However, examples described herein are not limited to cursor inputs. For example, the display screen may be a touch-sensitive display, which can enable the user to provide touch inputs in the search box 202 (and subsequent type inputs using a virtual or analog keyboard).

In many examples, inputs in the search box 202 can cause the operator tag search system 100 to perform dynamic searches and generate a live results feature 250 for display on the search page GUI 200, as described in connection with FIG. 1. For example, the user can initially select search property 204, which can cause the page generator 110 to generate the first operator tag 210 in the search box 202. Once the operator tag is generated for search property 204, the user can select an operator 206 and input a value 208 into the first operator tag 210. Based on such inputs, the search module 150 of the operator tag search system 100 can perform a dynamic search in the database system 190, and the page generator can update the live results feature 250 on the search page GUI 200.

In various implementations, a close feature 211 can be generated on a periphery of an element within the search box 202 (e.g., any operator tag, standalone search property, or qualifier element) in response to, for example, a hover-over input by the selector 222 crossing within the border of the element. Selection of the close feature 211 can cause the particular element to be deleted, and can automatically cause the dynamic search to be updated (e.g., expanded) by the search module 150.

In the example shown in FIG. 2, the user has constructed a first operator tag 210, a second operator tag 220, and a third operator tag 240. For the second operator tag 216, the user has selected a greater than or equal to operator 216 and inputted value 218. Each of the search property 214, the operator 216, and/or the value 218 may be selected from a respective drop-down menu 224. Additionally or alternatively, the user can partially or wholly input the search property 214, the operator 216, and/or the value 218. The user can further select and/or input a qualifier element (e.g., joinable modifier 230) to qualify one or more search properties 204, 214, 234, 244 in the search box 202. In the example shown, the user has selected a "time range" modifier 230 having a time range 226 starting at 2:00 pm, and ending at the current time. As a standalone modifier 230, the search module 150 would apply the time range 226 to each applicable search property 204, 214, 234, 244. When the user joins the modifier 230 to the second operator tag 220, the search module 150 will update the dynamic search such that the modifier 230 only qualifies the second operator tag 220. In other words the time threshold, between 2:00 pm and the current time, would only apply to search property 214 (e.g., ratings contributed since 2:00 pm).

For the third operator tag 240, the user has selected a less than operator and has inputted value 238. As an example, the third operator tag 240 can have a selected search property 234 corresponding to "trip count"—that is, a number of trips a driver has completed. In the example, the value 238 can be inputted as "20," so that the operator tag search system 100 filters the dynamic search to return only drivers having less than twenty completed trips. In various implementations, the user can qualify the third operator tag 240 by selecting a qualifier element (i.e., joined modifier 245) via an input to trigger the page generator 110 to display a search property menu (in this case a "distance modifier"). The user can select the modifier 245 from the menu, type the modifier 245 within the search box, or a combination of both. Once inputted, the modifier 245 may be selectable to choose a distance range (e.g., 10 miles) from, for example, the user's current location. Furthermore, the user can perform a select-and-drag input on the modifier 245 to join the modifier 245 to, for example, the third operator tag 240, thus limiting the range 246 to only search property 234.

As a standalone modifier, the modifier 245 would apply to every applicable search property in the search box 202. For example, with reference to the search criteria 252 in the live results feature 250, if the modifier 245 were standing alone in the search box 202, the search module 150 can limit each applicable search property 204, 214, 234, and 244 to within a ten mile range. Thus, in the search criteria 252, the ten mile range would apply to the "active drivers" standalone search property 244 (SAP), the "acceptance rate" search property 204 in the first operator tag 210, the "rating" search property 214 in the second operator tag 220, and the "trip count" search property 234 in the third operator tag 240. Accordingly, the dynamic search would yield search results for active drivers within a ten mile range of the user's current location, AND who have an acceptance rate of 85% within ten miles of the user's current location, AND who have a cumulative rating above 4.4-stars within ten miles of the user's current location, AND who have a trip count of less than twenty within ten miles of the user's current location.

However, in the example shown in FIG. 2, the user has joined the modifier 245 to the third operator tag 240, and therefore the joined modifier 245 only applies to the search property 234 (e.g., the "trip count" search property as shown in the search criteria 252). Thus, as shown in the search criteria 252, the dynamic search would set the ten mile threshold (i.e., selected range 246) to the "trip count" search property 234 in the third operator tag 240. Accordingly, the dynamic search would qualify the trip count for the available drivers to only trips initiated and/or completed within a ten mile radius of the user's current location.

According to examples, the user can input and/or select a standalone search property 244 to apply to the entire search. However, while search property 244 is shown in FIG. 2 as being included in the search box 202, the standalone search property 244 may be selected via, for example, a faceted hierarchical search index, and therefore also apply to the whole search box. With reference to the search criteria 252, the user has inputted and/or selected an "active drivers" search property 244 to apply to the whole dynamic search. Accordingly, the search module 150 can, from the outset, filter through the database system 190 to return only drivers that a current active.

Based on live search results 176, the page generator 110 can display the live results feature 250 to include items that satisfy the dynamic search. The search criteria 252 are shown for illustrative purposes, and may or may not be included on the search page GUI 200. In the example provided, the live results feature 250 lists items that satisfy the dynamic search, and may be updated by the page generator 100 whenever the dynamic search is updated. In the example provided, the live results feature 250 initially lists the drivers in a return list 266—initially showing Jack Abraham, Wolfgang von Falls, Graham Hilton, and Bruce McLain as the top results—with an initial total of fourteen results indicated. The return list 266 can include a scroll bar 264 to enable the user to scroll through the entirety of the list 266. Furthermore, the page generator 110 can display the return list 266 hierarchically based on, for example, a ranking for one or more of the search properties 204, 214, 234, 244. In the example shown, the page generator 110 has ordered the return list 266 based on the search property 204 in the first operator tag 210. However, the page generator 110 may execute optimization instructions to account for each of the search properties 204, 214, 234, 244, and thresholds applied thereon, in order to provide an optimized return list 266 indicating a ranking or items with most optimal results at the top. The live results feature 250 can include not only the names of items, but also data columns or regions indicating results for one or more of the search elements in the search box for each particular item, as shown by the columns in the return list.

Additionally, the search criteria 252, which can be dynamically modified based on inputs in the search box 202, can configure the DBS monitor 120 of the operator tag search system 100 to monitor the database system 190 for live updates that satisfy the dynamic search. The page generator can update the return list 266 whenever a live update is detected in the database system 190 that satisfies the search criteria 252. In the example provided, the DBS monitor 120 has identified that Jim Shark has exceeded the trip count threshold in the search criteria 252. This live data update 122 can trigger the page generator 110 to generate an update 262 in the live results feature 250 deleting Jim Shark from the return list 266. Accordingly, the DBS monitor 120 can cause the live results feature 250 to update based on live updates in for example, one or more live status logs in the database system 190.

Example Transportation Facilitation System

Figure 3:
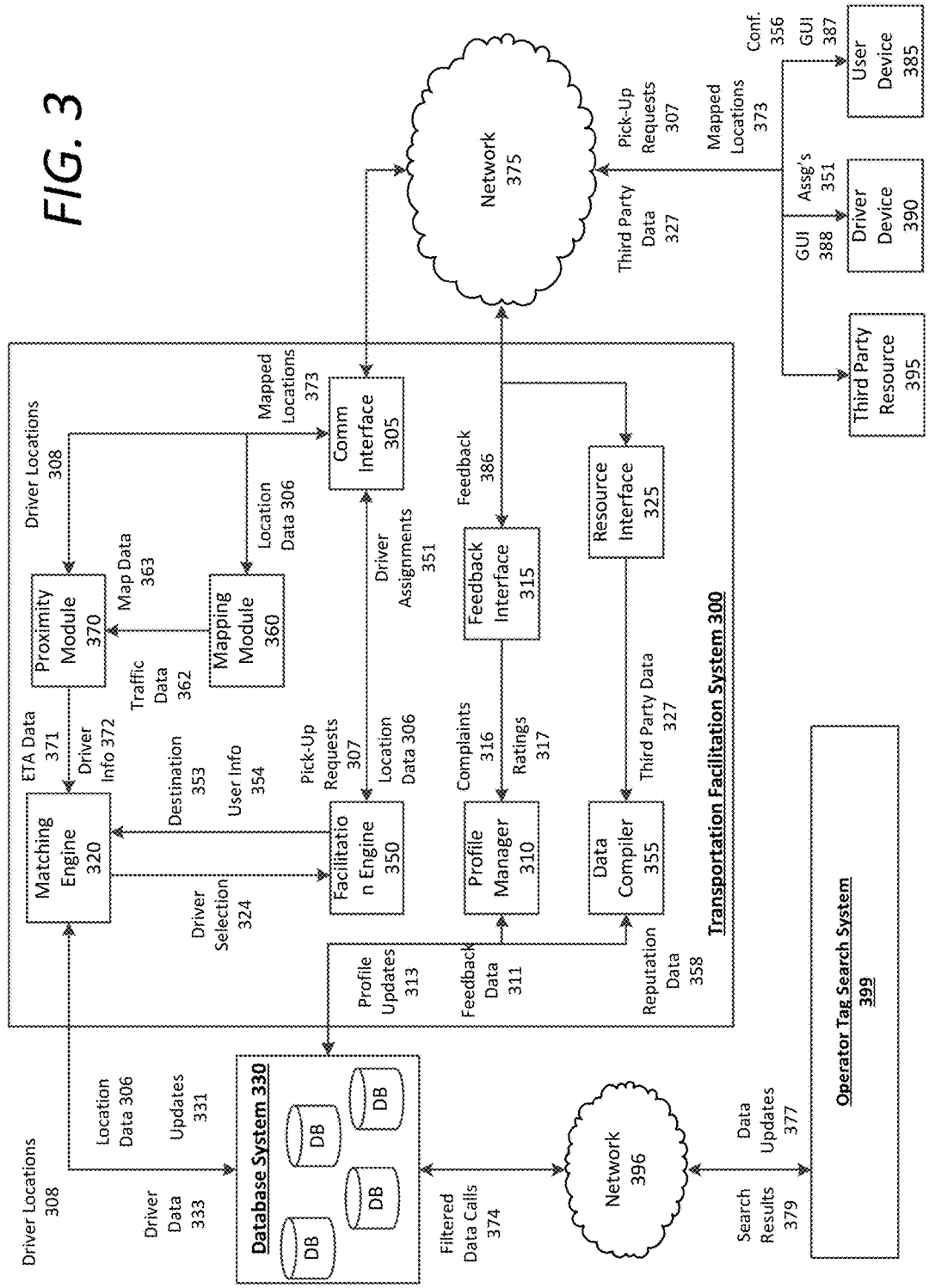
FIG. 3 is a block diagram illustrating an example transportation facilitation system, which can be implemented in connection with the operator tag search system, as described herein.

FIG. 3 is a block diagram illustrating an example transportation facilitation system for matching drivers with requesting users. A transportation facilitation system 300 can update a database system 330 (such as database system 190 described in connection with FIG. 1) that can store user and driver data for users and drivers of a network service, respectively. An operator tag search system 399 (such as operator tag search system 100 described in connection to FIG. 1) can communicate with the database system 330 in performing dynamic searches. The database system 330 can include live user and driver data provided by the transportation facilitation system 300 in real time. As described herein, the transportation facilitation system 300 (and/or the client applications operating on user devices and driver devices) can provide a network service or platform in which riders and drivers can be matched for receiving and providing transport services. For example, the network service can be accessible on user devices 385 and driver devices 390 via execution of a designated client application, which can generate a graphical user interface (GUI) 387 specific to the user device 385, or a GUI 388 specific to the driver device 390 (e.g., a rider application or a driver application, respectively). When a driver is selected to service a particular pick-up request 307, the transportation facilitation system 300 can generate and transmit an invitation to selected driver's computing device (running the driver application) to service the pick-up request 307.

Over time, as users and drivers receive and provide transport services, respectively, historical data about such completed transport services can be gathered/stored indicating relevant information concerning respective users and drivers. For example, when a given transport service (e.g., also referred to herein as a trip) is completed, the rider application can provide a GUI 387 that enables the user or rider of that trip to provide feedback for the driver. The user can provide input via the user device 385 to submit feedback information to the network service. In one example, the transportation facilitation system 300 can include a feedback interface 315 to receive feedback information (e.g., feedback 386) from rider applications that indicate the respective user's overall experience for any given completed trip. This feedback 386 can include a driver rating 317 for the driver of the trip (e.g., a star rating), and/or a complaint 316 against the driver for some form of infraction (e.g., rude behavior, disregard for traffic laws, the vehicle state, etc.). In some examples, the complaint 316 can be in the form of a textual message that is inputted by the user. As an addition or an alternative, the feedback 386 can include textual content or comments that may indicate positive feedback.

A profile manager 310 of the transportation facilitation system 300 can use such complaint data 316 and ratings data 317 (collectively "feedback data 311") to manage the various user profiles 332 and driver profiles 334 stored in the database system 330. For example, for each completed trip, the profile manager 310 can (i) associate the feedback data 311 to both a user profile 332 of the user that provided the feedback and/or a driver profile 334 of the driver that provided the trip for the user, and/or (ii) associate the feedback data 311 to a record associated with the completed trip (e.g., a trip record) stored in the database system 330. The profile manager 310 can also extrapolate or determine, for individual users, preference information using collected feedback data 311. As described herein, a trip record can include information associated with the transport service, such as the user information or identifier (ID), the driver information or ID, a start time and start location of the trip, an end time and end location of the trip, a vehicle type taken by the user, the route traveled, the price or fare for the trip, the feedback data of the driver (given by the user), the feedback data of the user (given by the driver), trip count, etc. In this manner, for a given user, the transportation facilitation system 300 can store historical data about trips that the user has taken as well as the driver ratings (e.g., two stars out of five stars, or five stars out of five stars, etc.) that that user gave to the individual drivers that provided those trips.

In one example, the feedback data 311 can link a sentiment between the user and the driver, which can further be linked to various conditions that existed or occurred with the trip, including, for example, the vehicle manufacturer or type, a class of the user (e.g., if the user is an employee of the entity that operates the transportation facilitation system 300), the price or price rate of the trip, the time and/or the day of the week, the end location or destination of the trip, etc. The transportation facilitation system 300 can extrapolate or determine an individual user's preferences based on what trip conditions existed or occurred that resulted in that user being satisfied with a trip or a driver of the trip, such that the user gave a high rating (e.g., four or five stars out of five) to that driver, or being dissatisfied with a trip or a driver of the trip, such that the user gave a low rating (e.g., zero to three stars) to that driver. Furthermore, the content of the feedback data 311 can provide further information regarding the user's preferences when receiving a transport service. The profile manager 310 can parse through or analyze the content of the feedback data 311 submitted by a given user for a driver to determine the user preferences. Additionally or alternatively, the designated application can include a feature that enables the given user to set various preferences.

In some examples, a user profile can include a blacklist feature where the user is enabled to blacklist certain drivers to avoid future pairings. For matching operations, the matching engine 320 may identify whether one or more proximate drivers, in relation to the requesting user, are included in the user's blacklist. If so, the transportation facilitation system 300 may automatically disregard the blacklisted driver(s) from the matching operation. Additionally or alternatively, the user preferences can be incorporated into the given user's profile, and can include an assortment of factors, such as a preferred vehicle type (e.g., luxury cars, SUVs, a preferred brand of vehicle, hybrid electric cars, driverless vehicles, and the like). Other factors may be concealed in the feedback data 311 such as a preference towards punctuality, a preference (or lack thereof) towards newer vehicles, an age range preference for the driver, and the like. The profile manager 310 can identify and flag such preferences in the given user's profile. Additionally or alternatively, each user profile can include various user information, such as age, height, weight, gender, eye color, hair color, background, home address, work address, citizenship, country of origin, and various other user data, preferences, or configurations.

Furthermore, such feedback data 311 can enable the profile manager 310 to compile a given driver's profile comprising live driver data based on overall performance and merit. The driver profile can include an overall rating for the driver (e.g., 4.67 stars), as well as individual ratings and/or complaints given by users, time and location stamps for each particular rating and complaint, and the like. Each individual rating may be driver and/or destination specific. Accordingly, the profile manager 310 can identify various performance traits of the given driver. For example, the feedback data 311 may indicate that the given driver excels on certain types of trips (e.g., trips to the airport, trips in dense urban centers, etc.), while lagging behind in performance on other types of trips (e.g., long distance trips, trips on mountainous roads, etc.). For instance, a given driver may have received an average rating of 4.95 stars when that driver provides transport from San Francisco to San Francisco International Airport (e.g., from data analyzed from one hundred such trips the driver completed), but may have received an average rating of 4.23 stars when that driver provides within the San Francisco city limits for trips lasting longer than 15 minutes (e.g., from data analyzed from two hundred such trips the driver completed). Based on the feedback data 311, the profile manager 310 can determine that the given driver excels on certain types of trips and lags behind on other types of trips.

As other examples, the feedback data 311 may indicate whether the given driver maintains a relatively well-ordered vehicle interior, whether the given driver maintains the condition of the vehicle, whether the driver is punctual, etc. All such factors may be compared against the user's preferences when the transportation facilitation system 300 performs a matching operation. Additionally or alternatively, each of the driver profiles 334 can also include driver information, such as age, height, weight, gender, eye color, hair color, background, vehicle type, home address, citizenship, country of origin, and various driver preferences.

In certain implementations, the transportation facilitation system 300 can further include a data compiler 355, which can pull third-party data 327 from one or more third party resources 395 over the network 375. For example, the data compiler 355 can pull reputation data 358, via a resource interface 325, for a particular driver. The reputation data 358 can indicate background information of the particular driver relating to, for example, public service, studiousness, work ethic, former military service, former law enforcement service, family background information, and the like. However, the reputation data 358 can also indicate concerning information such as a criminal history, a violent background, an affiliation with a criminal or scandalous group, delinquent financial behavior, or a propensity towards harassment, drugs or alcohol, other irresponsible behavior, etc. Such reputation data 358 may be incorporated into the given driver's profile 334 for use during a matching operation by the transportation facilitation system 300.

Additionally or alternatively, the transportation facilitation system 300 can store and update records for one or more fleets of autonomous vehicles (AVs) that can be utilized to service pick-up requests 307. For each AV, the records can include live location information, service records, vehicle type, vehicle features, vehicle status (e.g., in use or available), home location, remaining fuel or power, a trip count and/or summary, an AV user rating, available services (e.g., Internet connectivity, user interface features, entertainment features, etc.), and the like. The transportation facilitation system 300 can update the AV records for any number of events, or type of events. Thus, each AV may include an AV profile in the database system 330 that comprises AV data that may be dynamically updated, and thus accessed by a connected operator tag search system 399.

The transportation facilitation system 300 can include a transportation facilitation engine 350, which can provide driver assignments 351 to service individual pick-up requests 307 based on a variety of factors. The transportation facilitation system 300 may include a communication interface 305 for communication with user devices 385 and driver devices 390. A user that wishes to submit a pick-up request 307 can launch the designated application on the user's device 385 (e.g., a smartphone, a tablet computer, a wearable computing device, a personal computer, etc.), which can generate a GUI 387 specific to the transport service. Using the GUI 387, the user can send a pick-up request 307 indicating a pick-up location and/or a destination (as well as a vehicle type). The pick-up location can correspond to a current location of the user device 385 (by using geo-aware or location-based resources of the user device 385) or a specified location inputted by the user. The communication interface 305 can provide the pick-up request 307 to the facilitation engine 350, which can submit the requesting user's information 354 (e.g., the user's name, a unique identifier, or some other identifying criteria of the user) to a matching engine 320 of the transportation facilitation system 300.

Upon receiving the pick-up request 307, the facilitation engine 350 may also receive location data 306 of the requesting user. The location data 306 may be received via location-based resources of the user device 385, or may be received as a part of the pick-up request 307. The location data 306 may further be transferred to a mapping module 360 of the transportation facilitation system 300. Upon launching the designated application, or upon receiving the pick-up request 307, a proximity module 370 of the transportation facilitation system 300 can identify the driver locations 308 of all available (or unavailable) proximate drivers in relation to the requesting user. In one example, a driver tracking component (e.g., not shown in FIG. 3 for purpose of simplicity) can periodically receive location information (e.g., the driver locations 308) corresponding to the current location of the driver from the driver devices 390 and provide the location information to the proximity module 370 and/or can store the location information in the database system 330 that is accessible by the proximity module 370. The mapping module 360 can provide the location of the requesting user and provide map data 363 of a geographic region that includes or corresponds to the pick-up location to the proximity module 370. Additionally, the mapping module 360 may further provide traffic data 362 to the proximity module 370 identifying traffic conditions near the requesting user. While the mapping module 360 of FIG. 3 is shown as a component of the transportation facilitation system 300, other arrangements are contemplated in which the mapping data 363 and traffic data 362 are provided by an external mapping resource over the network 375.

As an addition or alternative, the proximity module 370 can utilize the map data 363, including the pick-up location, and the driver locations 308 to identify the proximate drivers in relation to the requesting user (or the user's specified pick-up location). In some implementations, the proximity module 370 can provide the mapped locations 373 to the user's device 385—where the mapped locations 373 can include a map comprising the real-time relative locations of proximate drivers in relation to the user's current location, or in relation to a pinned pick-up location configured by the requesting user on the GUI 387.

The proximity module 370 can determine which drivers are within a predetermined distance of the pick-up location (e.g., within four miles) and/or are within an estimated time of travel from the pick-up location (e.g., within six minutes). For example, the proximity module 370 can utilize the driver locations 308, the map data 363, and/or the traffic data 362 to determine an estimated time of arrival (ETA) 371 for each of the proximate drivers to the user's location. As described below, the ETA data 371 for each proximate driver can be utilized by the matching engine 320 as one of a number of optimization factors to ultimately select an optimal driver to service the pick-up request 307.

As provided herein, the matching engine 320 can receive the user information 354 of the requesting user from the facilitation engine 350. The matching engine 320 can further receive driver information 372 for the proximate drivers identified by the proximity module 370. According to examples described herein, the matching engine 320 can utilize the user information 354 from the pick-up request 307 and the driver information 372 to perform a lookup of the driver profiles 334 of the proximate drivers and the user profile 332 of the requesting user. Based on the information in the driver profiles 334 and the user profile 332, the matching engine can make a driver selection 324, from the proximate drivers, to service the received pick-up request 307. Additionally, the matching engine 320 can utilize further information, external to the information provided in the user profile 332 and driver profiles 334. For example, the matching engine 320 can utilize the ETA data 371 generated by the proximity module 370. Additionally or alternatively, the matching engine 320 can utilize the destination 353 indicated by the user. Further information, such as environmental factors, pricing conditions, traffic conditions, etc., may also be considered by the matching engine 320.

In various examples, the matching engine 320 can make comparisons between the driver data 333 in the driver profiles 334 of the proximate drivers, and the preference data 331 indicated in the user profile 332 of the requesting user. As discussed above, this driver data 333 can include driver traits (e.g., driver behaviors, tendencies) and ratings from the feedback data 311 compiled by the profile manager 310 and/or reputation data 358 gathered by the data compiler 355. Additionally, the driver data 333 can include invariable data including, for example, the driver's age, gender, vehicle type, and the like. Further, the preference data 331 may include preferences directly configured by the requesting user, or preferences determined by the profile manager 310 based on the requesting user's rating history.

The preference data 331 may indicate that the requesting user favors certain factors over other factors. Thus, certain factors may be weighted more heavily than other factors. For example, the preference data 331 may indicate that the requesting user has no preference for the type of car, but a strong preference for drivers that have a high overall rating. The matching engine 320 may weigh the factors accordingly. Furthermore, certain factors may be relevant while others may be irrelevant to a driver selection 324 by the matching engine 320.

For example, for illustrative purposes, for a given user, the profile manager 310 can extrapolate or determine (e.g., from hundreds of driver ratings given by that user for previously completed trips) the preference data 331 for that user. The profile manager 310 can determine that when the user is assigned a vehicle that is a larger vehicle type (e.g., an SUV as compared to a sedan or a hybrid sedan), the user has given 95% of those drivers a maximum satisfaction score (e.g., five stars out of five stars), and when the user is assigned a vehicle that is a sedan, the user has given 70% of those drivers a maximum satisfaction score. In another example, the profile manager 310 can determine that when ten out of twelve textual feedback given by that user corresponds to a complaint about the cleanliness of the vehicle, and that such drivers received a low score (e.g., two stars or less out of five stars). Still further, in another example, the profile manager 310 can extrapolate that when the price is high (e.g., a price multiplier of 1.5 times the default price at the time the request was made) the user has given only 25% of those drivers a maximum satisfaction score and that 50% of those drivers received a medium score (e.g., three stars out of give stars). Such extrapolated preference data 311 can indicate to the transportation facilitation system 300 that during such high pricing conditions, the user is most likely going to give a medium to low rating for drivers unless the user receives a driver/vehicle or trip that meets or exceeds the user's expectations.

The weighted relevant factors from the preference data 331 may be compared to the driver data 333 for the proximate drivers, the ETA data 371, and/or the destination 353 indicated by the user. Collectively, these optimization factors can be utilized by the matching engine 320 to run a matching operation in order to make the most optimal driver selection 324 from the proximate drivers. For example, the matching engine 320 can compute an optimization score, based on the factors, for each of the proximate drivers. The optimization score can correspond to a probability that the requesting user will provide the respective proximate driver with a maximum satisfaction rating (e.g., five stars out of five stars). The driver selection 324 may be based on a highest probability that the selected driver will receive a 5-star rating from the requesting user. Similarly, the driver selection 324 may be based on an overall score calculated by the matching engine 320 based on the results of the matching operation.

As an addition or an alternative, the matching engine 320 may set a threshold value (e.g., an 82% probability that the driver will receive a 5-star rating). Based on a matching operation, the matching engine 320 may determine that none of the proximate drivers exceed the threshold value. In such scenarios, the matching engine 320 may select the driver having a score closest to the threshold value. Alternatively, the matching engine 320 can request that the proximity module 370 expand the pool of proximate drivers until the matching engine identifies a driver exceeding the threshold value. According to such examples, the matching engine 320 can dynamically run matching operations to dynamically determine whether any driver from a current pool of proximate drivers exceeds the threshold value. Thus, the driver selection 324 may be made based on the results of such dynamic operations.

In accordance with examples described herein, the facilitation engine 350 can receive a pick-up request 307 from a respective user device 385 and transmit identifying user info 354 and the selected destination 353 to the matching engine 320. Furthermore, the proximity module 370 can identify proximate drivers in relation to the requesting user and calculate or estimate an ETA 371 for each of the proximate drivers. The matching engine 320 can utilize identification information for both the requesting user and the proximate drivers to pull the requesting user's profile 332 and the proximate drivers' profiles 334 to perform a matching operation. Utilizing the preference data 331 from the user profile 332, the matching engine 320 can identify and attribute weightings to relevant factors for the matching operation. Such relevant factors may include various user preferences which can be assessed against the driver data 333, the ETA data 371, the destination 353 (e.g., whether a particular driver has higher ratings for the destination 353), etc. Using such relevant optimization factors, the matching engine can perform the matching operation to identify and make a driver selection 324 of an optimal driver from the proximate drivers. The matching engine 320 can submit this driver selection 324 to the facilitation engine 350, which can transmit a driver assignment 351 or invitation to the selected optimal driver based on the matching operation. Once the selected driver accepts the assignment 351, e.g., by providing input on the driver application, the facilitation engine 350 can submit a confirmation 356 to the requesting user's device 385 indicating that the optimal driver has been selected for the user and is en route to service the user.

In various examples, the above data described in connection with the transportation facilitation system 300 can be stored in the database system 300. The database system 330 can include permanent or temporary storage frameworks that enable the transportation facilitation system 300 to provide live updates 331 to dynamic data for user devices 385 and/or driver devices 390 (e.g., live location data), user and driver profiles, driver reputation, ratings, trip counts, acceptance rates, etc. All such data may be updated dynamically by the transportation facilitation system 300. For example, the transportation facilitation system 300 can manage a number of live data logs in the database system 330 which can include live data corresponding to the transportation facilitation service. This live data can include indications of whether the designated application has been activated on a particular user device 185 or driver device 390, the current location of a particular user or driver (e.g., coordinate data), a live ratings indicator for a particular driver, a trip count indicator, various time and location stamps corresponding to pick-ups and drop-offs, correlation information between time and location stamps and other live data, vehicle data, a live status indicator (e.g., whether the driver is available, en-route, currently servicing a pick-up request 307, etc.), live acceptance rates, service area data, home locations, service type data, and the like.

According to examples, the operator tag search system 399 can enable a user to initiate dynamic searches by dynamically filtering data calls 374 for transmission to the database system 330 over a network 396. The dynamic search can yield live search results 379 for display on a search page GUI, as described with respect to FIGS. 1 and 2. A DBS monitor of the operator tag search system 399 can further monitor the database system 330 for data updates 377 that satisfy the search criteria of the dynamic search. Accordingly, the operator tag search system 399 can modify the dynamic search in real time based on user inputs on the search page GUI, and can update a live results feature on the search page GUI based on the live search results 379. Furthermore, when data updates 377 are detected that satisfy the search criteria, the operator tag search system 399 can further update the live results feature accordingly.

Methodology

Figure 4:
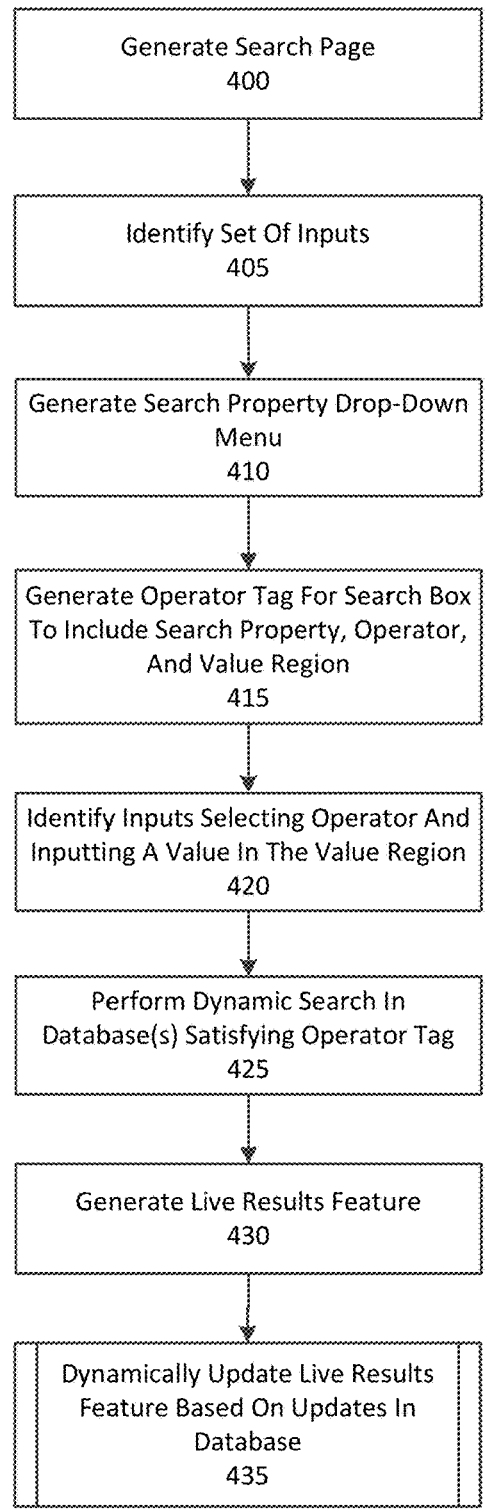
FIG. 4 is a high level flow chart describing an example method of facilitating a dynamic search in connection with an operator tag search system.

FIG. 4 is a high level flow chart describing an example method of facilitating a dynamic search in connection with an operator tag search system. In the below description of FIG. 4, reference may be made to like reference characters representing various features of FIG. 1 for illustrative purposes. Furthermore, the high level method described in connection with FIG. 4 may be performed by an example operator tag search system 100 as illustrated in FIG. 1. Referring to FIG. 4, the operator tag search system 100 can generate a search page GUI 182 for a user device 185 (400). The search page GUI 182 can include a search box to enable the user to provide inputs. The operator tag search system 100 can identify a set of inputs in the search box (405). The set of inputs may be an initial input, such as a click or touch input, and/or one or more type inputs in the search box. In response to the initial set of inputs, the search system 100 can generate a search property menu, such as a drop-down menu, to enable the user to select from a list of search properties that satisfy the initial set of inputs (410).

As described herein, the search property menu may be updated by the search system 100 for each respective input, from the initial set of inputs, in the search box. Once a first search property is selected, the search system 100 can generate a first operator tag for the search box to include the selected search property, an operator menu, and a value region. (415). The search system 100 can identify inputs corresponding to the user selecting an operator and inputting a value in the value region (420). Any of the search property, operator, or value may be inputted manually or selected from a generated list of relevant menu items.

Based on such selections and/or inputs, the operator tag search system 100 can configure and perform a dynamic search in a number of relevant databases that satisfy the search parameters indicated in the operator tag (425). Based on the results, the search system 100 can generate a live results feature 184 for display on the user device 185 (430). Furthermore, in one example, the search system 100 can dynamically update the live results feature 184 based on updates identified in the database(s) that satisfy the search parameters of the operator tag (435).

Figure 5:
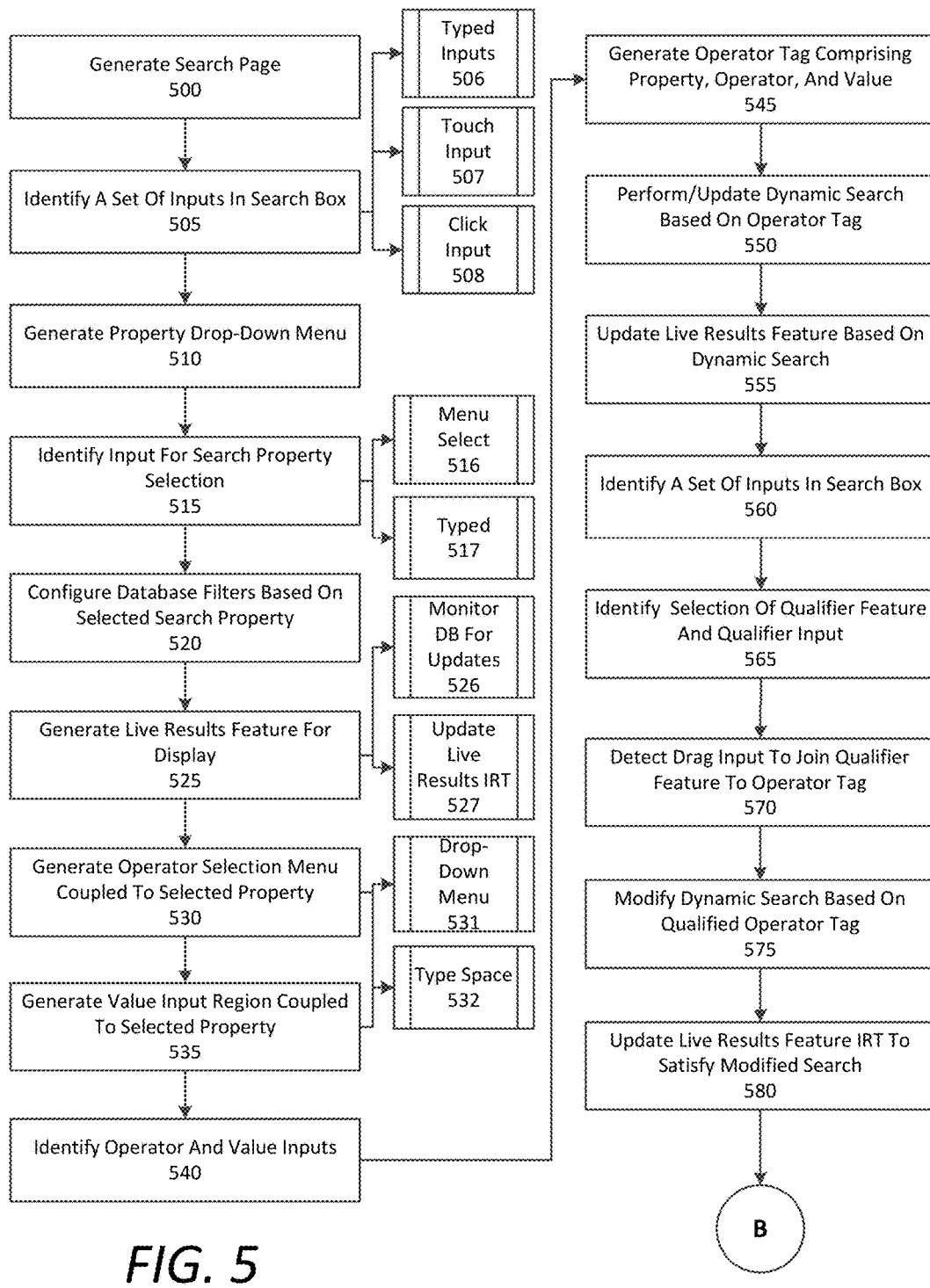
FIGS. 5 and 6 are flow charts describing an example low level method of facilitating a dynamic search in connection with an operator tag search system.
Figure 6:
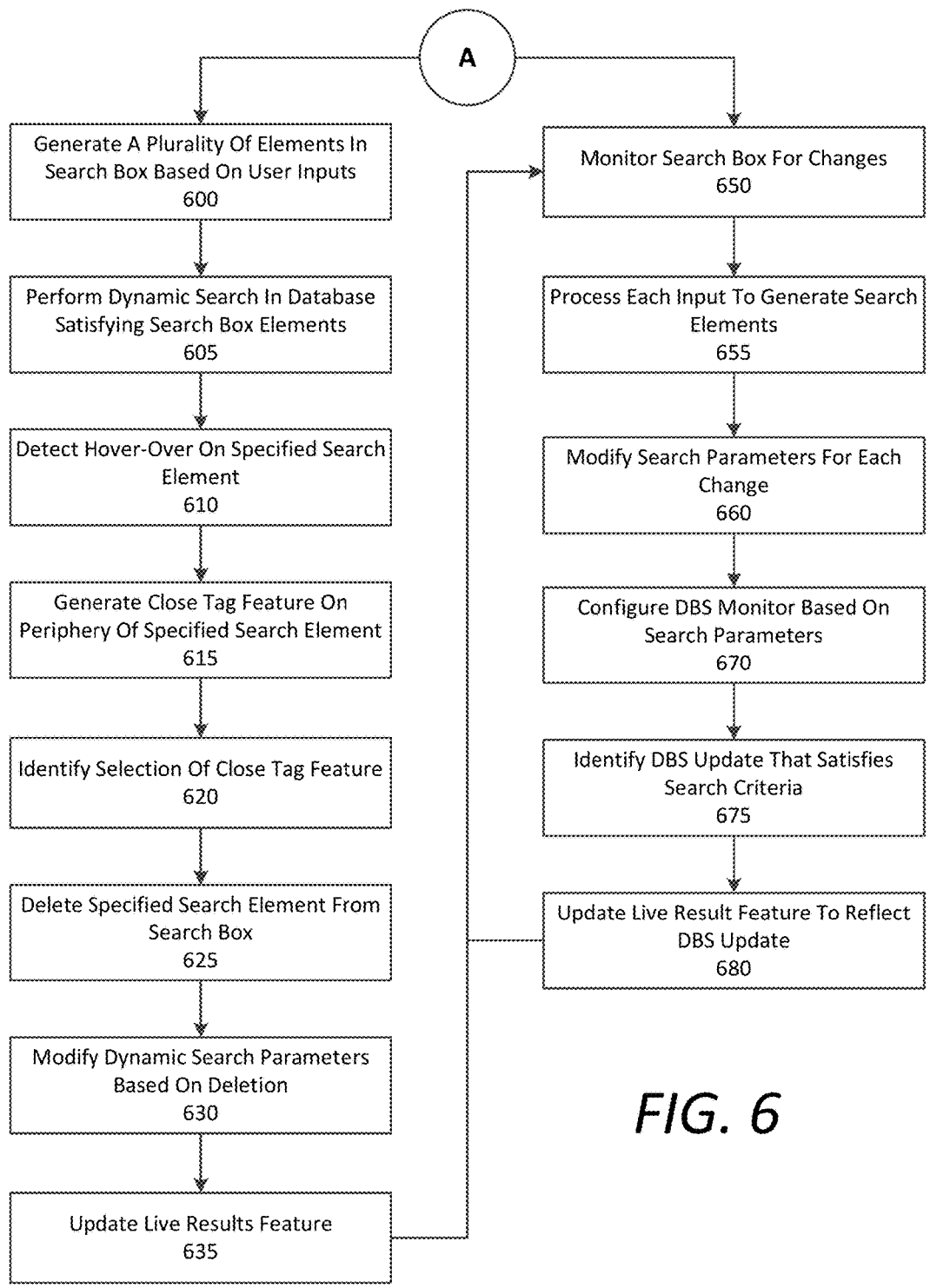

FIGS. 5 and 6 are flow charts describing an example low level method of facilitating a dynamic search in connection with an operator tag search system. In the below description of FIGS. 5 and 6, reference may be made to like reference characters representing various features of FIG. 1 for illustrative purposes. Furthermore, the low level method described in connection with FIGS. 5 and 6 may be performed by an example operator tag search system 100 as illustrated in FIG. 1. Referring to FIG. 5, the operator tag search system 100 can generate a search page GUI 182 for display on a user device 185 (500). The search system 100 can identify an initial set of inputs in the search box of the search page GUI 182 (505). The initial set of inputs can comprise typed inputs (506), a touch input (507), or a click input (508). In response to the initial set of inputs, the search system 100 can generate a drop-down menu comprising a listing of search properties based on the set of inputs (510). The search property drop down menu can be updated for each respective input in the initial set of inputs such that the listed search properties.

The search system 100 can further identify an input in the search box indicating a search property selection (515). This input can comprise a selection of a particular search property in the menu (516), a typed input of the whole search property (517), or when a partially typed search property yields only a single possible result (which can trigger the operator tag search system 100 to generate an operator tag for that search property). In response to the selection, the search system 100 can configure an initial filtered data call 174 for the database system 190 to initiate the dynamic search based on the selected search property (520). The dynamic search can return a list of results, which can be displayed on a live results feature 184 generated by the search system 100 on the user device 185 (525). The search property can further configure the DBS monitor 120 to monitor the database system 190 for real-time updates that satisfy the search property (526). Thus, the operator tag search system 100 can update the live results feature 184 in real time based on identified data updates 199 that satisfy the search property (527).

In conjunction with initiating the dynamic search, the page generator 110 of the search system 100 can generate an operator selection menu (530), and a value input region (535) coupled to the selected search property. One or both of the operator selection menu or the value input region can comprises a drop-down menu (531) and/or a type space for manual input (532). While the example of FIG. 5 illustrates steps 535 being performed after step 530, in other examples, steps 535 and 530 can be performed concurrently or step 535 can be performed before step 530. The search system can generate the operator selection menu and the value input region as a single search element coupled to the search property. Thus, in conjunction with initiating the dynamic search, the search system 100 can generate an operator tag comprising each of the selected search property, the operator drop-down menu, and the value input region (545). Alternatively, the search system 100 can generate the operator tag (545) in response to identifying operator and value inputs in the respective operator menu and value region (540). Alternatively, The search system 100 can hold off on initiating the dynamic search until the operator and value inputs are identified (540), and the operator tag is generated (545).

The user can change the operator, the value, and/or the search property itself at any time during the dynamic search. Accordingly, the search system 100 can perform or update the dynamic search based on the operator tag (550) (i.e., the search property, the operator, and the inputted value). Furthermore, for every applicable input in the operator tag and/or search box, the search system 100 can update the live results feature 184 to reflect the live search results 176 of the dynamic search (555). Still further, the DBS monitor 120 can detect updates in the database system 190 that satisfy the search parameters defined in the search box at any given time, and trigger the page generator 110 to update the live results feature 184 accordingly.

Additionally, the search system 100 can detect a second set of inputs in the search box outside a periphery of the first operator tag (560). In response, the search system 100 can generate a selection menu comprising a list of possible search properties. On the list, may be search properties that can trigger the search system 100 generate additional operator tags, and thus the method can move back to block 510. Also on the list, may be standalone search properties (causing the search system 100 to apply the property to the dynamic search) and/or qualifier elements. The search system 100 can identify a user selection of a qualifier element and a user selection or input of a qualifier input (565). As described, a qualifier input may comprise a range, such as a time range, a date range, a location range, and the like. Prior to joining the qualifier element, the search system 100 can update the dynamic search and apply the range to all applicable operator tags and/or search properties identified in the search box.

Additionally or alternatively, the search system 100 can detect a drag input, or select-and-drag input to join the qualifier element to a particular operator tag in the search box (570). In response, the search system 100 can modify the dynamic search based on the now qualified operator tag (575) by applying the selected range to that operator tag only. The returned results can then cause the search system 100 to update the live results feature 184 on the user device 185 (580). The low level method may then move to "B," which denotes the method described with respect to FIG. 6.

Referring to FIG. 6, the method can continue from "A," which denotes the method described with respect to FIG. 5, and in which the search system 100 can generally generate a plurality of search elements in the search box based on user inputs and selections of applicable search properties (600). Specifically, the search elements can include operator tags, standalone search properties, qualifier elements, and qualified operator tags with tag modifiers joined thereto. At any given time, the search system 100 can also monitor the search box for changes (650). The search system 100 can perform a dynamic search based on all elements in the search box, and update the dynamic search for additional inputs provided, as described above (605). The search system 100 can detect a hover-over input on any of the specified search elements (610). The hover-over input can comprise hovering a cursor over a periphery of a particular search element using a cursor for PCs or laptops, or a sensor that can detect a finger or stylus hovering over a search element in the search box.

The hover-over input can trigger the page generator 110 to generate a close tag feature on a periphery of the indicated search element (615). The search system 100 may then detect a selection of the close tag feature (620) and delete the specified search element from the search box (625). The search system 100 can modify or expand the dynamic search parameters based on the deletion (630), and update the live results feature 194 accordingly (635).

The operator tag search system can continuously monitor the search box for inputted changes by the user (650). The search system 100 can further process each respective input in the search box to determine whether to generate an operator tag, a standalone search element, a qualifier element, etc. (655). The search system 100 can further modify the search parameters of the dynamic search for each applicable change detected in the search box (660). Additionally, the search system 100 can configure the DBS monitor 120 based on the search parameters to monitor the database system 190 only for updates that satisfy the search parameters. At any given time, the operator tag search system 100 can detect a live data update 122 in the database system 190 that satisfies the dynamic search (675). Accordingly, the search system 100 can update the live results page 194 to reflect the database system 190 update (680) and continue monitoring the search box for changes (650).

Figure 7:
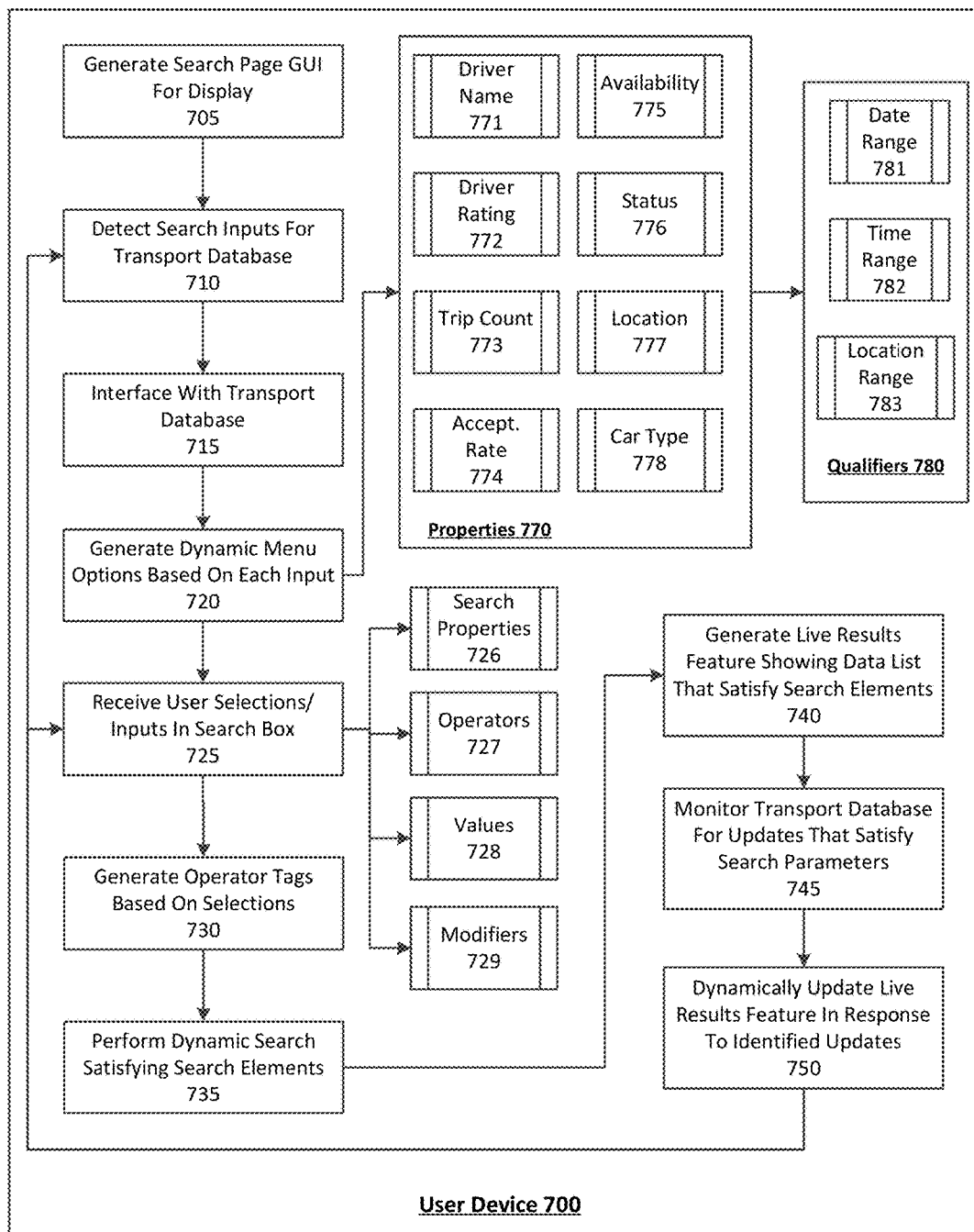
FIG. 7 is a flow chart describing an example method of facilitating a dynamic search between a transportation facilitation system in connection with an operator tag search system.

FIG. 7 is a flow chart describing an example method of facilitating a dynamic search between a user device in connection with an operator tag search system. The method as described with respect to FIG. 7 may be performed by, for example, a user device 185 as illustrated in FIG. 1. Referring to FIG. 7, a user device 700 can be a computing device to perform searches on databases, such as described in FIG. 1, or in some examples, searches for data content specifically associated with a transportation facilitation system 300 as described in connection with FIG. 3. The user device 700 can be communicatively coupled to or execute an operator tag search system, such as the search system 100 described in connection with FIG. 1. The operator tag search system can be a back end server system connected to the user device 700, or may be executed as a software application or browser plug-in on the user device 700 to utilize the processing and memory resources of the user device 700.

In many examples, the user can provide an input to cause the user device 700 to generate a search page GUI including a search box on a display screen (705). The user device 700 can detect search inputs in the search box corresponding to data content stored a database system of the transportation facilitation service (710). The user device 700 can interface with the transportation facilitation service database system to initiate a dynamic search based on search elements in the search box (715). Based on the search inputs, the user device 700 can generate dynamic menu options based on each applicable input in the search box (720). As provided herein, the menu options can include search properties 770 corresponding to any number of search terms. For example, the search properties 770 can be listed in a dynamic menu filtered based on the search box inputs. The search properties 770 can include, without limitation, a driver name (771), a driver rating (772), a trip count (773), an acceptance rate (774), an availability of a driver or vehicle (e.g., an autonomous vehicle) (775), a status (e.g., fuel or power status, service status, interior or exterior status, etc.) (776), location (777), vehicle type (778), and various other data relevant to the transportation facilitation service, as described above with respect to FIG. 3.

As further described above, the search box inputs can also cause the user device 700 to generate one or more qualifier elements 780. Example qualifier elements 780 enable the user to specify a particular date range (781), a time range (782), or a location range (783) for a select operator tag or search property.

The user device 700 can receive user selections or inputs in the search box (725) specifying individual search properties (726), operators (727), values (728), and modifiers (729). The user device 700 can generate operator tags based on the previous selections (730), as discussed herein, and perform or update the dynamic search to satisfy search parameters defined by the search elements in the search box (735). Accordingly, in response to the dynamic search, or any update to the dynamic search, the user device 700 can generate and/or update a live results feature showing a data list that satisfies the search elements. The live results feature can include not only the names of items, but also data columns or regions indicating results for one or more of the search elements in the search box for each returned item.

In conjunction, the user device 700 can monitor the transportation facilitation system database for updates that satisfy the dynamic search parameters (745). Accordingly, the user device 700 can dynamically update the live results feature on the search page GUI to reflect the detected updates in the database system (750). The method shown in FIG. 7 can continue back to block 710 or 725 thereafter depending on additional inputs in the search box.

Hardware Diagrams

Figure 8:
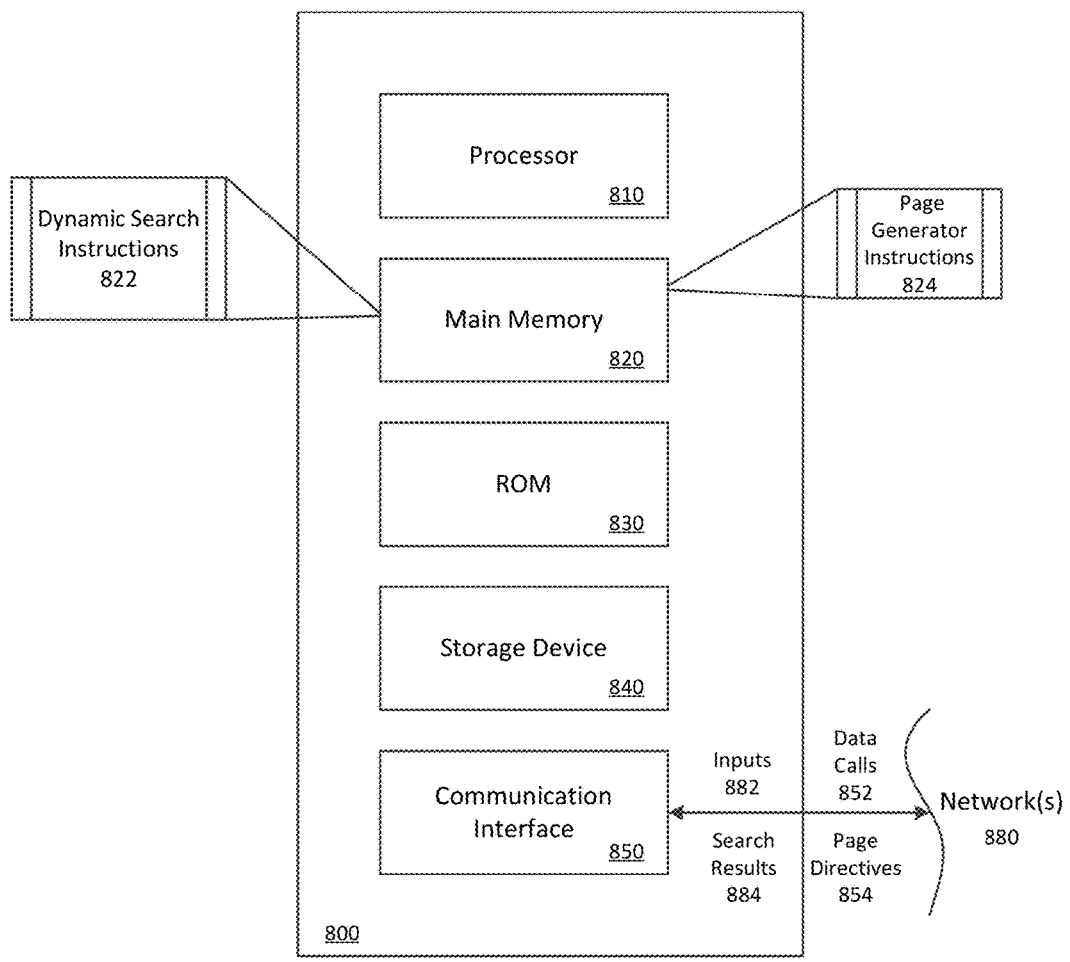
FIG. 8 is a block diagram illustrating an example computing system upon which examples described herein may be implemented.

FIG. 8 is a block diagram that illustrates a computer system upon which examples described herein may be implemented. A computer system 800 can be implemented on, for example, a server or combination of servers. For example, the computer system 800 may be implemented as part of a search service executed over one or more networks. In the context of FIG. 1, the operator tag search system 100 may be implemented using a computer system such as described by FIG. 8. The operator tag search system 100 may also be implemented using a combination of multiple computer systems as described in connection with FIG. 8.

In one implementation, the computer system 800 includes processing resources 810, a main memory 820, a read-only memory (ROM) 830, a storage device 840, and a communication interface 850. The computer system 800 includes at least one processor 810 for processing information stored in the main memory 820, such as provided by a random access memory (RAM) or other dynamic storage device, for storing information and instructions which are executable by the processor 810. The main memory 820 also may be used for storing temporary variables or other intermediate information during execution of instructions to be executed by the processor 810. The computer system 800 may also include the ROM 830 or other static storage device for storing static information and instructions for the processor 810. A storage device 840, such as a magnetic disk or optical disk, is provided for storing information and instructions.

The communication interface 850 enables the computer system 800 to communicate with one or more networks 880 (e.g., cellular network) through use of the network link (wireless or wired). Using the network link, the computer system 800 can communicate with one or more computing devices, and one or more servers. In accordance with examples, the computer system 800 receives search box inputs and menu selections 882 from computing devices of users. The executable instructions stored in the memory 830 can include dynamic search instructions 822, which the processor 810 executes to construct filtered data calls 852 to perform a dynamic search. The executable instructions stored in the memory 820 can also include page generator instructions 824, which enable the computer system 800 to transmit dynamic page directives 854 to the user device to generate and update page elements, as described herein. By way of example, the instructions and data stored in the memory 820 can be executed by the processor 810 to implement an example operator tag search system 100 of FIG. 1. In performing the operations, the processor 810 can receive search box inputs 882, generate and transmit data calls to a database system based on the search box inputs, receive search results 884 and updates from the database system, and transmit dynamic page directives 854 via the communication interface 850.

The processor 810 is configured with software and/or other logic to perform one or more processes, steps and other functions described with implementations, such as described by FIGS. 1 through 7, and elsewhere in the present application.

Examples described herein are related to the use of the computer system 800 for implementing the techniques described herein. According to one example, those techniques are performed by the computer system 800 in response to the processor 810 executing one or more sequences of one or more instructions contained in the main memory 820. Such instructions may be read into the main memory 820 from another machine-readable medium, such as the storage device 840. Execution of the sequences of instructions contained in the main memory 820 causes the processor 810 to perform the process steps described herein. In alternative implementations, hard-wired circuitry may be used in place of or in combination with software instructions to implement examples described herein. Thus, the examples described are not limited to any specific combination of hardware circuitry and software.

Figure 9:
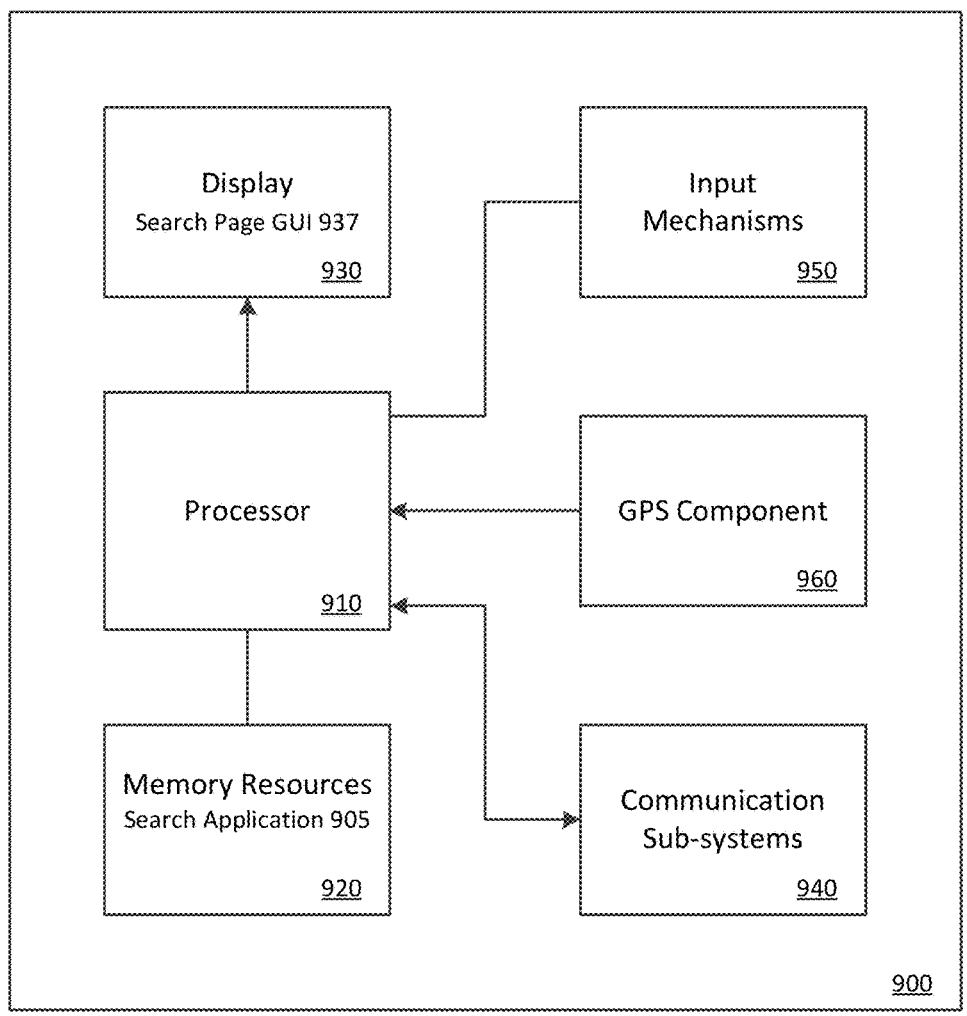
FIG. 9 is a block diagram illustrating an example computing device upon which examples described herein may be implemented.

FIG. 9 is a block diagram that illustrates a computing device upon which examples described herein may be implemented. In one example, a computing device 900 may correspond to, for example, a cellular communication device (e.g., feature phone, smartphone etc.) that is capable of telephony, messaging, and/or data services. In variations, the computing device 600 can correspond to, for example, a personal computer (PC), a tablet computer, or wearable computing device. Still further, the computing device 900 can be distributed amongst multiple users of a search system 100 as described herein.

In an example of FIG. 9, the computing device 900 includes a processor 910, memory resources 920, a display device 930 (e.g., such as a touch-sensitive display device), one or more communication sub-systems 940 (including wireless communication sub-systems), input mechanisms 950 (e.g., a virtual or analog keyboard), and/or one or more location detection mechanisms (e.g., GPS component) 960. In one example, at least one of the communication sub-systems 940 sends and receives data over data channels and/or voice channels.

A user can operate the computing device 900 to enable or connect with the search system 100. The memory resources 920 can store a search application 907 which can be executed by the processor 910 to cause a search page GUI 937 to be generated on the display 930. User interaction with the search page GUI 937 can enable the user to trigger dynamic searches, which enables the operator tag search system 100 to return dynamic results in a live results feature for the search page GUI 937.

While examples of FIG. 8 and FIG. 9 provide for a computer system 800 and computing device 900 for implementing aspects described, in some variations, the computing device 900 can operate to implement some or all of the functionality described with the operator tag search system 100.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. An operator tag search system comprising:
one or more processors; and
one or more memory resources storing instructions that, when executed by the one or more processors, cause the operator tag search system to:
generate a search page including a search box for display on a user device;
identify an initial set of user inputs in the search box;
in response to identifying the initial set of user inputs, generate a search property drop-down menu comprising a set of search properties;
identify a user selection of one of the set of search properties;
generate a first operator tag in the search box, the first operator tag comprising (i) the selected search property, (ii) an operator drop-down menu, and (iii) a value region;
generate one or more joinable modifiers for the search box, each of the one or more joinable modifiers being selectable to qualify a value range for the value region of the first operator tag;
identify (i) a user selection of a specified operator in the operator drop-down menu, and (ii) an inputted value in the value region;
identify (i) a user input coupling a joinable modifier to the value region of the first operator tag, and (ii) one or more user inputs defining a value range in the coupled joinable modifier;
perform a search in one or more databases to satisfy each of the selected search property, the specified operator, the inputted value, and the defined value range of the coupled joinable modifier for the first operator tag;
monitor the one or more databases for live updates that satisfy each of the selected search property, the specified operator, the inputted value, and the defined value range for the first operator tag; and
based on performing the search and monitoring the one or more databases, (i) generate a live results feature for display on the search page, and (ii) update the live results feature dynamically to include the live updates.

2. The operator tag search system of claim 1, wherein the executed instructions cause the operator tag search system to generate the search property drop-down menu dynamically by updating the set of search properties in real time in response to each of the initial set of user inputs to provide a filtered subset of search properties.

3. The operator tag search system of claim 1, wherein the executed instructions further cause the operator tag search system to:
identify a second set of user inputs in the search box proximate to the first operator tag;
in response to receiving the second set of user inputs, generate a second search property drop-down menu comprising a second set of search properties;
identify a user selection of a second search property of the second set of search properties; and
in response to the user selection of the second search property, (i) update the search to satisfy the first operator tag and the second search property, (ii) update the live results feature on the search page to reflect the updated search, and (iii) generate a second operator tag in the search box proximate to the first operator tag, the second operator tag comprising the second search property, an operator drop-down menu, and a value region.

4. The operator tag search system of claim 3, wherein the executed instructions further cause the operator tag search system to:
in the second operator tag, identify a user selection of a specified operator in the operator drop-down menu and an inputted value in the value region;

update the search to satisfy the first operator tag and the second operator tag; and
update the live results feature on the search page to reflect the updated search satisfying the first operator tag and the second operator tag.

5. The operator tag search system of claim 4, wherein the executed instructions further cause the operator tag search system to:
monitor the one or more databases for a second set of live updates that satisfy the first operator tag and the second operator tag; and
update the live results feature dynamically to include the second set of live updates.

6. The operator tag search system of claim 1, wherein the executed instructions further cause the operator tag search system to:
identify additional user inputs in the search box selecting a plurality of search properties, and a corresponding operator and inputted value for each of the plurality of selected search properties;
generate a respective plurality of operator tags each combining a respective one of the plurality of search properties with the corresponding operator and inputted value for the respective search property;
update the search to satisfy each of the first operator tag and the respective plurality of operator tags; and
update the live results feature on the search page to reflect the updated search satisfying the first operator tag and the respective plurality of operator tags.

7. The operator tag search system of claim 6, wherein the executed instructions further cause the operator tag search system to:
monitor the one or more databases for a second set of live updates that satisfy the first operator tag and the respective plurality of operator tags; and
update the live results feature dynamically to include the second set of live updates.

8. The operator tag search system of claim 6, wherein the executed instructions cause the operator tag search system to generate the search property drop-down menu dynamically to further include a number of additional joinable modifiers for the search box, each of the additional joinable modifiers being selectable to (i) when not coupled to an operator tag in the search box, qualify one or more thresholds for the search as a whole, or (ii) when coupled to a particular operator tag in the search box, qualify one or more thresholds for the particular operator tag.

9. The operator tag search system of claim 8, wherein the executed instructions further cause the operator tag search system to:
identify (i) a user selection of a specified joinable modifier in the search property drop-down menu, and (ii) one or more user inputs defining one or more thresholds in the specified joinable modifier.

10. The operator tag search system of claim 9, wherein the executed instructions further cause the operator tag search system to:
update the search as a whole to satisfy the first operator tag, the respective plurality of operator tags, and the one or more thresholds defined in the specified joinable modifier; and
update the live results feature on the search page to reflect the updated search satisfying the first operator tag, the respective plurality of operator tags, and the one or more thresholds defined in the specified joinable modifier.

11. The operator tag search system of claim 9, wherein the executed instructions further cause the operator tag search system to:
identify a select-and-drag input on the specified joinable modifier, the select-and-drag input joining the specified joinable modifier to one of the respective plurality operator tags in the search box to generate a qualified operator tag;
set boundaries for the qualified operator tag based on the one or more thresholds defined in the specified joinable modifier;
narrow the updated search in the one or more databases to reflect the boundaries on the qualified operator tag; and
update the live results feature on the search page to reflect the narrowed and updated search.

12. The operator tag search system of claim 11, wherein the one or more thresholds defined in the specified joinable modifier define a date range, a time range, or a location radius for the qualified operator tag.

13. The operator tag search system of claim 6, wherein the executed instructions cause the operator tag search system to generate each of the first operator tag and the respective plurality of operator tags in the search box as a separate individual search filter object, and wherein the executed instructions cause the operator tag search system to update the search by interpreting gaps between each of the separate individual search filter objects as BOOLEAN "AND" operators.

14. The operator tag search system of claim 6, wherein the executed instructions further cause the operator tag search system to:
identify a hover-over input on a selected one of the first operator tag or one of the respective plurality of operator tags;
in response to identifying the hover-over input, display a tag close feature on a periphery of the selected operator tag;
identify a selection of the tag close feature to delete the selected operator tag from the search box;
expand the updated search to reflect deletion of the selected operator tag; and
update the live results feature on the search page based on the expanded and updated search.

15. The operator tag search system of claim 1, wherein the one or more databases comprise live driver data for a plurality of drivers in connection with a transportation service.

16. The operator tag search system of claim 15, wherein the live driver data comprises dynamic data for each of an availability status and a current driver rating for each of the plurality of drivers, and wherein each of the availability status and the current driver rating for each of the plurality of drivers are included as search properties in the set of properties displayed in the search property drop-down menu.

17. The operator tag search system of claim 15, wherein the executed instructions further cause the operator tag search system to:
monitor the one or more databases for specific updates to the live driver data that satisfies the first operator tag; and
dynamically update the live results feature on the search page to reflect the specific updates to the live driver data.

18. A non-transitory computer readable medium storing instructions that, when executed by one or more processors of an operator tag search system, cause the operator tag search system to:
- generate a search page including a search box for display on a user device;
- identify an initial set of user inputs in the search box;
- in response to identifying the initial set of user inputs, generate a search property drop-down menu comprising a filtered set of search properties;
- identify a selection of one of the filtered set of search properties;
- generate a first operator tag in the search box, the first operator tag comprising (i) the selected search property, (ii) an operator drop-down menu, and (iii) a value region;
- generate one or more joinable modifiers for the search box, each of the one or more joinable modifiers being selectable to qualify a value range for the value region of the first operator tag;
- identify a user selection of a specified operator in the operator drop-down menu and an inputted value in the value region;
- identify (i) a user input coupling a joinable modifier to the value region of the first operator tag, and (ii) one or more user inputs defining a value range in the coupled joinable modifier;
- perform a search in one or more databases to satisfy each of the selected search property, the specified operator, the inputted value, and the defined value range of the coupled joinable modifier for the first operator tag;
- monitor the one or more databases for live updates that satisfy each of the selected search property, the specified operator, the inputted value, and the defined value range for the first operator tag; and
- based on performing the search and monitoring the one or more databases, (i) generate a live results feature for display on the search page and (ii) update the live results feature dynamically to include the live updates.

19. A computer-implemented method for enabling targeted searching in one or more databases, the method being performed by one or more processors of an operator tag search system and comprising:
- generating a search page including a search box for display on a user device;
- identifying an initial set of user inputs in the search box;
- in response to identifying the initial set of user inputs, generating a search property drop-down menu comprising a filtered set of search properties;
- identifying a selection of one of the filtered set of search properties;
- generating a first operator tag in the search box, the first operator tag comprising (i) the selected search property, (ii) an operator drop-down menu, and (iii) a value region;
- generating one or more joinable modifiers for the search box, each of the one or more joinable modifiers being selectable to qualify a value range for the value region of the first operator tag;
- identifying a user selection of a specified operator in the operator drop-down menu and an inputted value in the value region;
- identifying (i) a user input coupling a joinable modifier to the value region of the first operator tag, and (ii) one or more user inputs defining a value range in the coupled joinable modifier;
- performing a search in the one or more databases to satisfy each of the selected search property, the specified operator, the inputted value, and the defined value range for the first operator tag;
- monitoring the one or more databases for live updates that satisfy each of the selected search property, the specified operator, the inputted value, and the value range for the first operator tag; and
- based on performing the search and monitoring the one or more databases, (i) generating a live results feature for display on the search page and (ii) update the live results feature dynamically to include the live updates.

* * * * *